Patented Aug. 26, 1924.

1,506,189

UNITED STATES PATENT OFFICE.

ANNA A. MacKENZIE, OF FREMONT, OHIO, ASSIGNOR TO NATIONAL CARBON COMPANY, INC., A CORPORATION OF NEW YORK.

ELECTRIC CELL CONTAINING A SALT INHIBITING THE PRODUCTION OF GAS.

No Drawing.    Application filed November 4, 1920.  Serial No. 421,744.

*To all whom it may concern:*

Be it known that I, ANNA A. MACKENZIE, a citizen of the United States, residing at Fremont, in the county of Sandusky and State of Ohio, have invented certain new and useful Improvements in Electric Cells Containing a Salt Inhibiting the Production of Gas, of which the following is a specification.

Dry cells as ordinarily constructed include a carbon electrode centered in a zinc cup, which serves as the other electrode, the annular space between the electrodes containing a mix of powdered conducting and depolarizing materials wet with electrolyte solution, and the cup being provided with a seal of pitch or the like. The electrolyte solution is an aqueous solution of zinc chloride and ammonium chloride while the constituents of the powdered mix are carbon in some form, manganese dioxide, either natural or artificial, and undissolved ammonium chloride. Batteries of the above construction are subject to the defect known as "gassing", which results in the evolution of gases within the cell even when the latter is on open circuit, the quantity of gas produced often being in excess of the amount which can escape through the minute interstices normally present between the seal and the electrodes. Under such conditions, the cell may become "bulged" and the members which confine its contents be ruptured or disarranged with consequent leakage of liquid and deterioration of the battery.

While the evolution of gas is due in part to local action at the zinc, decomposing the electrolyte into gaseous constituents, a part of the gases formed may result from the inter-reaction of substances within the cell, exclusive of the metallic zinc. While I cannot say with certainty which materials participate in the gas-forming reaction, I believe that the action of the soluble salts, for example, the zinc chloride, on carbonates occurring as impurities in the manganese dioxide depolarizer, is one of the causes of such gassing. Both pyrolusite and various forms of artificial manganese dioxide commonly contain carbonates.

The object of my invention is to prevent or reduce gassing of the kind described, with its deleterious effects upon dry cells.

I have found that the addition of a small quantity of alkaline earth chloride to the electrolyte solution is very efficacious in preventing gassing. It is my present opinion that barium chloride gives the best results of any of the alkaline earth chlorides. The amount of barium chloride used appears to be immaterial, so long as it is above a certain minimum. If the quantity of barium chloride used is considerable in comparison with the zinc chloride, the latter may be correspondingly reduced, the two chlorides being approximately equivalent, weight for weight, in their behavior, except as to the gassing-preventing feature. Good results have been obtained with the following proportions of materials: 100 parts of manganese dioxide are mixed with 35 parts of carbonaceous material and 13.5 parts of ammonium chloride. This mixture is then suitably wetted with a solution containing water 100 parts, zinc chloride 16 parts, barium chloride 2 parts and ammonium chloride 33 parts. The use of barium chloride in the electrolyte does not require any change in the usual procedure in constructing dry cells.

I claim:

1. An electric cell subject to damage by a gas-evolving reaction of the electrolyte, and containing an alkaline earth metal chlorid, whereby such reaction is substantially inhibited.

2. An electric cell containing manganese depolarizer and an electrolyte comprising zinc chlorid and ammonium chlorid, said cell being subject to damage by a gas-evolving reaction of the electrolyte, and an alkaline earth metal chlorid dissolved in said electrolyte and substantially inhibiting such reaction.

3. The invention according to claim 2, in which the alkaline earth metal chlorid is barium chlorid.

4. The invention according to claim 2, in which about 2 parts of barium chlorid are associated with about 16 parts of zinc chlorid and 33 parts of ammonium chlorid.

5. A sealed electric cell containing manganese depolarizer and electrolyte salts, said depolarizer containing substances tending to react with the electrolyte salts to produce gas, and an alkaline earth metal chlorid included among said salts and substantially inhibiting such reaction.

In testimony whereof, I affix my signature.

ANNA A. MacKENZIE.